United States Patent
Sun et al.

(10) Patent No.: US 10,922,778 B2
(45) Date of Patent: Feb. 16, 2021

(54) SYSTEMS AND METHODS FOR DETERMINING AN ESTIMATED TIME OF ARRIVAL

(71) Applicant: BEIJING DIDI INFINITY TECHNOLOGY AND DEVELOPMENT CO., LTD., Beijing (CN)

(72) Inventors: Shujuan Sun, Beijing (CN); Xinqi Bao, Beijing (CN); Zheng Wang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 15/980,702

(22) Filed: May 15, 2018

(65) Prior Publication Data
US 2018/0357736 A1    Dec. 13, 2018

Related U.S. Application Data

(63) Continuation of application No. PCT/CN2017/087879, filed on Jun. 12, 2017.

(51) Int. Cl.
*G06Q 50/30* (2012.01)
*G06N 3/08* (2006.01)
(Continued)

(52) U.S. Cl.
CPC .............. *G06Q 50/30* (2013.01); *G01C 21/00* (2013.01); *G06N 3/04* (2013.01); *G06N 3/08* (2013.01); *G06N 5/003* (2013.01); *G06N 20/00* (2019.01)

(58) Field of Classification Search
CPC .................... G06Q 50/30; G06N 99/005
(Continued)

(56) References Cited

U.S. PATENT DOCUMENTS 7,512,487 B1 *   3/2009   Golding ............ G01C 21/3492
                                                        701/424
8,879,813 B1    11/2014   Solanki et al.
(Continued)

FOREIGN PATENT DOCUMENTS

CN    103377552 A    10/2013
CN    104123841 A    10/2014
(Continued)

OTHER PUBLICATIONS

Parolas et. al.; "Prediction of Vessels' Estimated Time of Arrival (ETA) Using Machine Learning—A Port of Rotterdam Case Study"; Nov. 15, 2016 (Year: 2016).*

(Continued)

*Primary Examiner* — Kevin H Flynn
*Assistant Examiner* — Emmett K. Walsh
(74) *Attorney, Agent, or Firm* — Metis IP LLC

(57) ABSTRACT

Systems and methods for processing at least one service request for an on-demand service are provided. The systems may perform the methods to obtain a plurality of example service orders, each example service order of the plurality of example service orders may include a feature associated with a section of a plurality of sections of a measurement; cluster the plurality of example service orders into a plurality of subsets of example service orders, the feature of each example service order in a same subset of example service orders may be associated with a same section of the measurement; for each of the plurality of subsets of example service orders, train a first model of estimated time of arrival (first ETA model) using the subset of example service (Continued)

orders; and store structured data in the at least one storage medium encoding the plurality of first ETA models.

18 Claims, 10 Drawing Sheets

(51) Int. Cl.
 *G01C 21/00* (2006.01)
 *G06N 3/04* (2006.01)
 *G06N 5/00* (2006.01)
 *G06N 20/00* (2019.01)
(58) Field of Classification Search
 USPC .......................................................... 705/13
 See application file for complete search history.

(56) References Cited

U.S. PATENT DOCUMENTS

| | | | |
|---|---|---|---|
| 9,239,989 B2 | 1/2016 | Bouqata et al. | |
| 2013/0262349 A1* | 10/2013 | Bouqata ................. | G06N 20/00 706/12 |
| 2015/0228188 A1* | 8/2015 | Macfarlane .......... | G08G 1/0129 340/936 |
| 2016/0314818 A1 | 10/2016 | Kirk et al. | |
| 2017/0270790 A1* | 9/2017 | Neiger ................... | G08G 1/127 |
| 2018/0115598 A1* | 4/2018 | Shariat ................... | H04L 67/10 |

FOREIGN PATENT DOCUMENTS

| | | |
|---|---|---|
| CN | 104637334 A | 5/2015 |
| CN | 106056950 A | 10/2016 |
| CN | 106528874 A | 3/2017 |
| WO | 0063866 A1 | 10/2000 |

OTHER PUBLICATIONS

Jeong et. al.; "Bus Arrival Time Prediction Using Artificial Neural Network Model"; Published in Proceedings. The 7th International IEEE Conference on Intelligent Transportation Systems; Mar. 7, 2005 (Year: 2005).*
Park et. al., "Learning user preferences of route choice behaviour for adaptive route guidance", IET Intell. Transp. Syst., 1, (2), pp. 159-166 (Year: 2007).*
International Search Report for PCT/CN2017/087879 dated Feb. 22, 2018, 4 pages.
Written Opinion for PCT/CN2017/087879 dated Feb. 22, 2018, 4 pages.

* cited by examiner

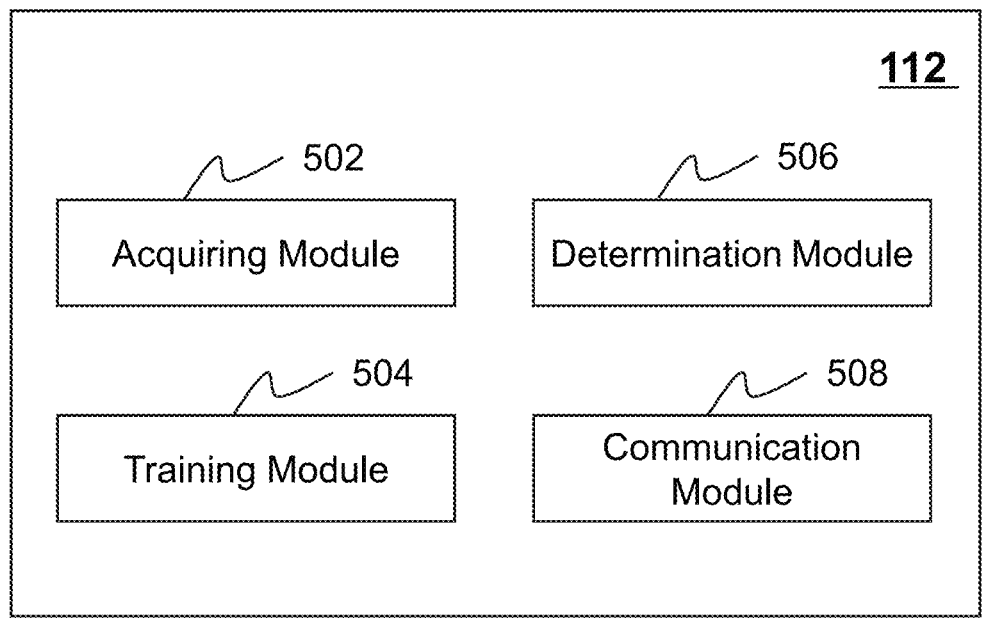
FIG. 5-A
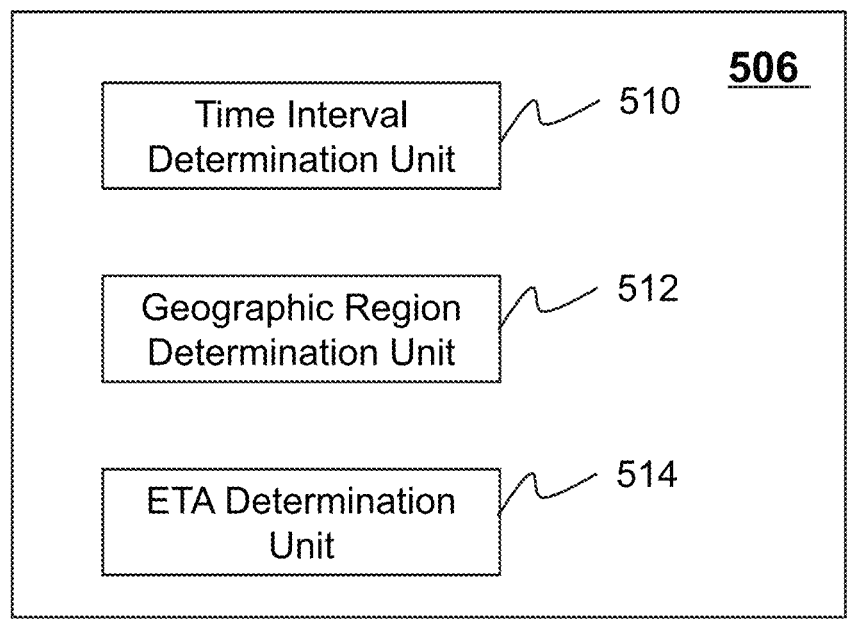
FIG. 5-B

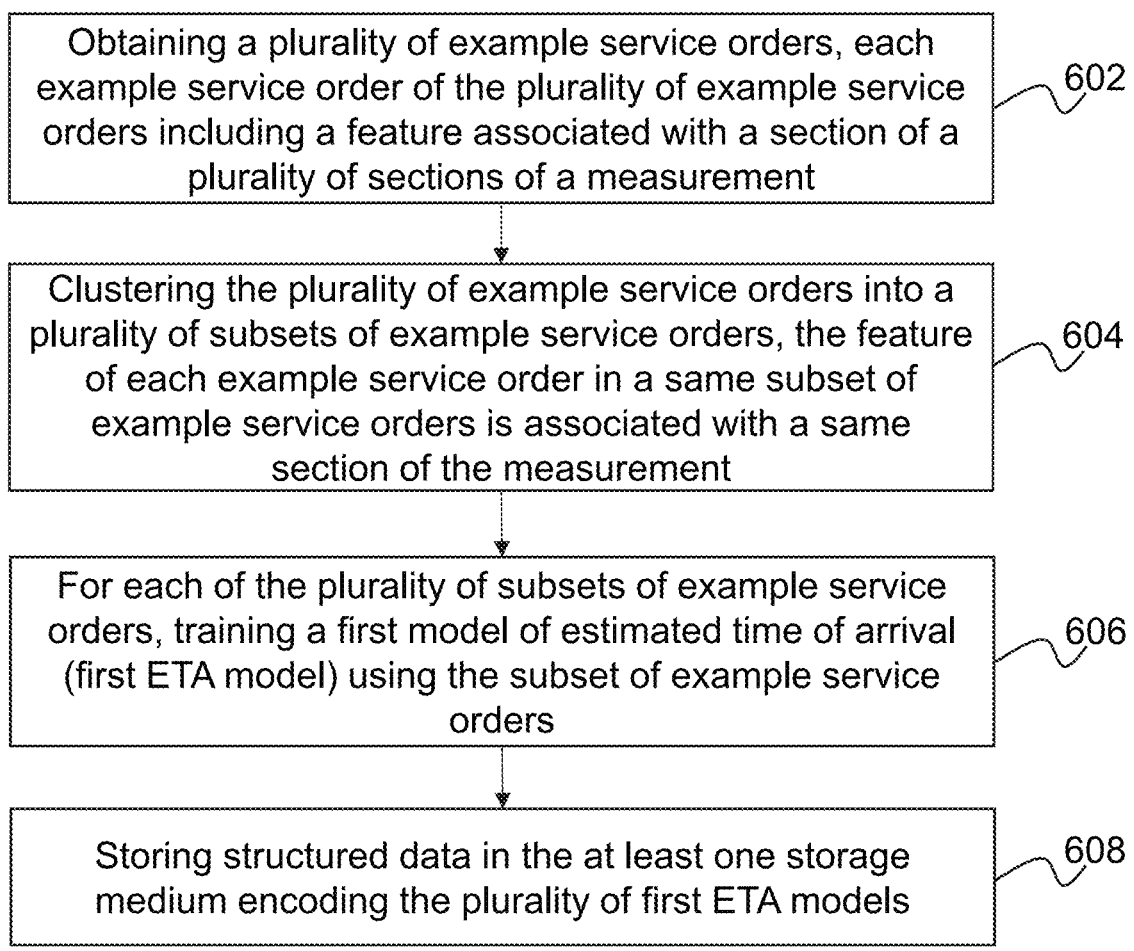
FIG. 6-A

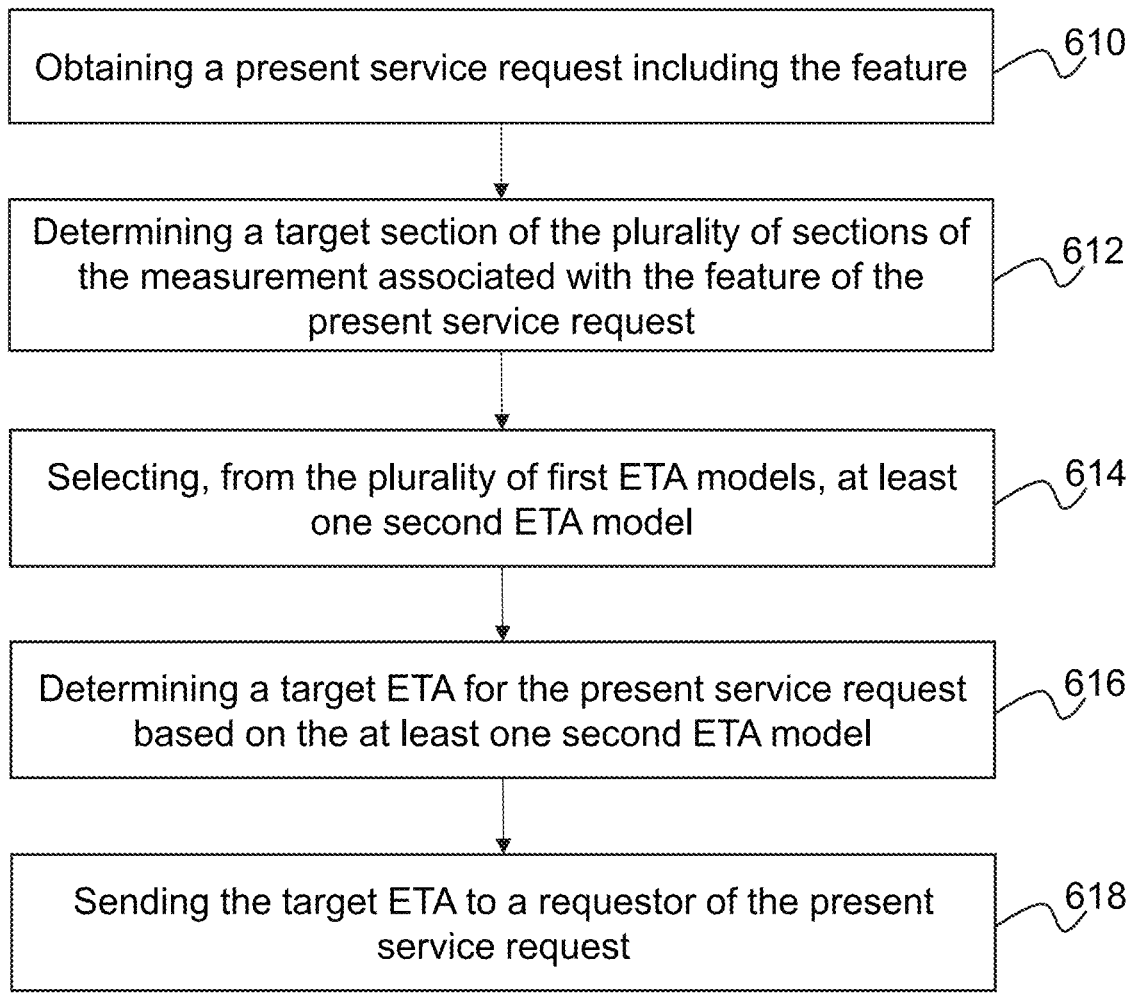
FIG. 6-B

| 710 | 720 | 730 | 740 | 750 | 760 | 770 |
|---|---|---|---|---|---|---|
| Route ID | Driving distance | Number of traffic light | Road Width | Time Interval of a Starting time | Region of a Starting Location | Historical duration |
| 1 | 3km | 2 | 12m | 7:00-8:00 | A | 20min |
| 2 | 0.7km | 0 | 10m | 8:00-9:00 | B | 10min |
| 3 | 12km | 6 | 10m | 9:00-10:00 | C | 55min |
|  | X1 | X2 | X3 | X4 | Xn |  |

FIG. 7

SYSTEMS AND METHODS FOR DETERMINING AN ESTIMATED TIME OF ARRIVAL

CROSS-REFERENCE TO RELATED APPLICATIONS

This present application is a continuation application of International Application No. PCT/CN2017/087879, filed on Jun. 12, 2017, the contents of which are hereby incorporated by reference to its entirety.

TECHNICAL FIELD

The present disclosure generally relates to systems and methods for determining an estimated time of arrival (ETA) for a service request, and in particular, to systems and methods for training an ETA model using machine learning techniques and determining the ETA using the model of ETA.

BACKGROUND

Many location-based services and/or applications, such as web mapping services, navigation services, and online on-demand transportation services, may need accurate estimated time of arrival (ETA) to provide services. For example, a mapping service may need to automatically update ETA for a vehicle in real time to provide driving directions, navigation suggestions, positioning information, and other information of the mapping service to users.

SUMMARY

According to an aspect of the present disclosure, an electronic system is provided. The electronic system may include at least one non-transitory computer-readable storage medium and at least one processor configured to communicate with the at least one non-transitory computer-readable storage medium. The at least one non-transitory computer-readable storage medium may include a set of instructions. When the at least one processor executes the set of instructions, the at least one processor may be directed to perform one or more of the following operations. The at least one processor may obtain a plurality of example service orders. In some embodiments, each example service order of the plurality of example service orders may include a feature associated with a section of a plurality of sections of a measurement. The at least one processor may cluster the plurality of example service orders into a plurality of subsets of example service orders. In some embodiments, the feature of each example service order in a same subset of example service orders may be associated with a same section of the measurement. The at least one processor may, for each of the plurality of subsets of example service orders, train a first model of estimated time of arrival (first ETA model) using the subset of example service orders. The at least one processor may store structured data in the at least one storage medium encoding the plurality of first ETA models.

In some embodiments, the measurement may include time. In some embodiments, each section of the plurality of sections of the measurement may include a predetermined period of time. In some embodiments, the feature may include at least one of a start time or an end time associated with an example service order of the plurality of example service orders.

In some embodiments, the measurement may include a location coordinate. In some embodiments, each section of the plurality of sections of the measurement may include a predetermined section of geographical area. In some embodiments, the feature may include at least one of a start location or an end location associated with an example service order of the plurality of example service orders.

In some embodiments, the at least one processor may obtain a service request including the feature. The at least one processor may determine a target section of the plurality of sections of the measurement associated with the feature of the service request. The at least one processor may select, from the plurality of first ETA models, at least one second ETA model. The at least one processor may determine a target ETA for the service request based on the at least one second ETA model. The at least one processor may send the target ETA to a requester of the service request.

In some embodiments, the at least one processor may determine at least one candidate ETA for the service request based on the at least one second ETA model. The at least one processor may determine the ETA for the service request based on the at least one candidate ETA.

In some embodiments, the at least one processor may determine a combination of the at least one candidate ETA.

In some embodiments, the at least one processor may apply a weight to at least one of the at least one candidate ETA.

In some embodiments, the at least one processor may determine a plurality of accuracy scores for the plurality of first ETA models. The at least one processor may select the at least one second ETA model based on the plurality of accuracy scores.

According to another aspect of the present disclosure, a method is provided. The method may include obtaining a plurality of example service orders; clustering the plurality of example service orders into a plurality of subsets of example service orders; for each of the plurality of subsets of example service orders, training a first model of estimated time of arrival (first ETA model) using the subset of example service orders; and storing structured data in the at least one storage medium encoding the plurality of first ETA models. In some embodiments, each example service order of the plurality of example service orders may include a feature associated with a section of a plurality of sections of a measurement. In some embodiments, the feature of each example service order in a same subset of example service orders may be associated with a same section of the measurement.

In some embodiments, the method may further include obtaining a service request including the feature; determining a target section of the plurality of sections of the measurement associated with the feature of the service request; selecting, from the plurality of first ETA models, at least one second ETA model; determining a target ETA for the service request based on the at least one second ETA model; and sending the target ETA to a requestor of the service request.

In some embodiments, the method may further include determining at least one candidate ETA for the service request based on the at least one second ETA model and determining the ETA for the service request based on the at least one candidate ETA.

In some embodiments, the method may further include determining a combination of the at least one candidate ETA.

In some embodiments, the method may further include applying a weight to at least one of the at least one candidate ETA.

In some embodiments, the method may further include determining a plurality of accuracy scores for the plurality first ETA models and selecting the at least one second ETA model based on the plurality of accuracy scores.

According to a third aspect of the present disclosure, a non-transitory computer readable medium is provided. The non-transitory computer readable medium may embody a computer program product. The computer program product may include instructions. The instructions may cause a computing device to effectuate a method. The computing device may obtain a plurality of example service orders. In some embodiments, each example service order of the plurality of example service orders may include a feature associated with a section of a plurality of sections of a measurement. The computing device may cluster the plurality of example service orders into a plurality of subsets of example service orders. In some embodiments, the feature of each example service order in a same subset of example service orders may be associated with a same section of the measurement. The computing device may, for each of the plurality of subsets of example service orders, train a first model of estimated time of arrival (first ETA model) using the subset of example service orders. The computing device may store structured data in the at least one storage medium encoding the plurality of first ETA models.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5-A is a block diagram illustrating an exemplary processing engine according to some embodiments of the present disclosure;

FIG. 5-B is a block diagram illustrating an exemplary determination module according to some embodiments of the present disclosure;

FIG. 6-A is a flowchart illustrating an exemplary process for determining an ETA model according to some embodiments of the present disclosure;

FIG. 6-B is a flowchart illustrating an exemplary process for determining an ETA of a present service request according to some embodiments of the present disclosure;

FIG. 7 is a table associated with an exemplary global feature vector according to some embodiments of the present disclosure;

DETAILED DESCRIPTION

Figure 1:
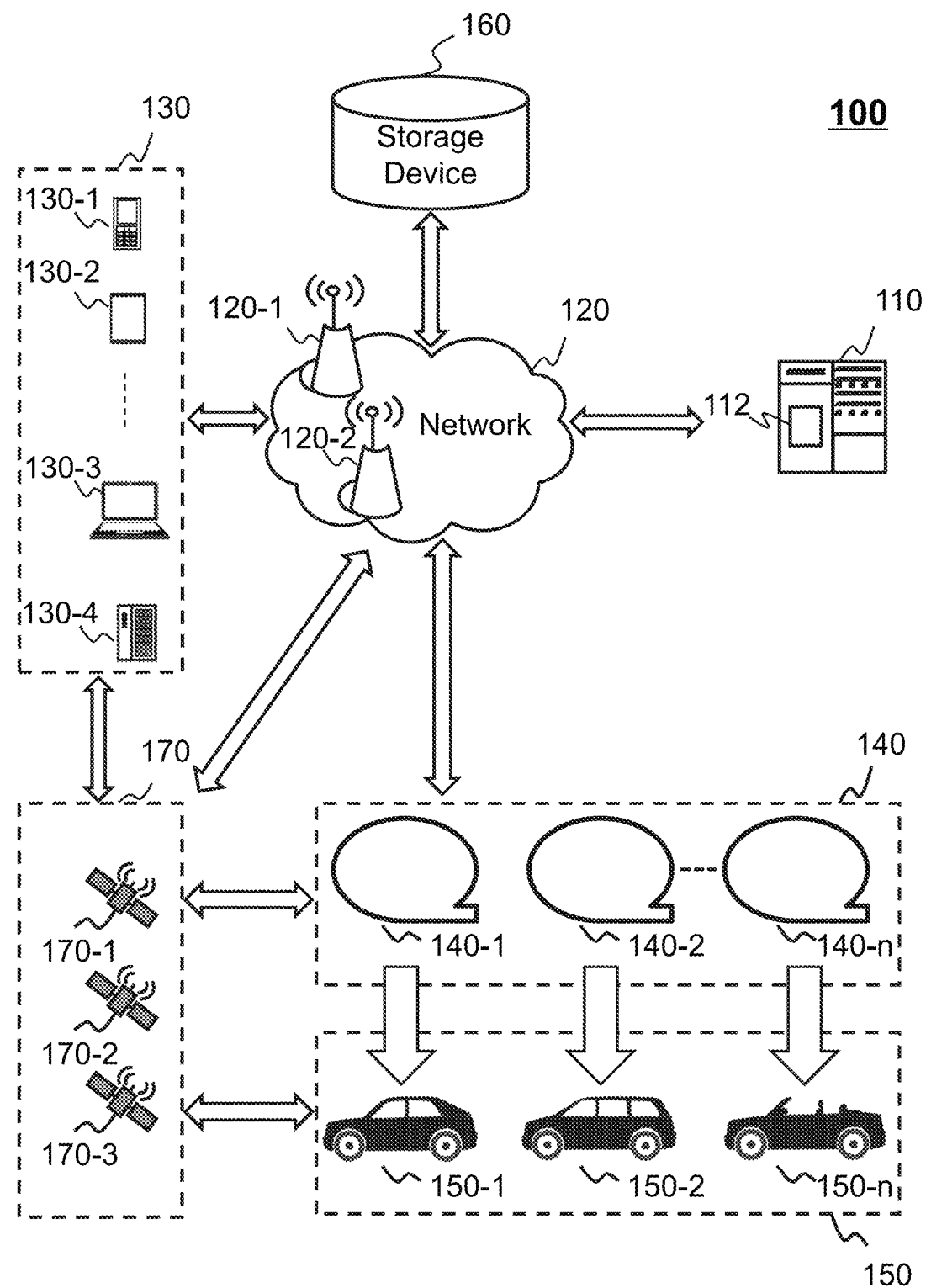
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to distributing a request for a transportation service, it should also be understood that the present disclosure is not intended to be limiting. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may be implemented on a user device and include a webpage, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The term "service request," "request for a service," "requests," and "order" in the present disclosure are used interchangeably to refer to a request that may be initiated by a passenger, a service requestor, a customer, a driver, a provider, a service provider, or the like, or any combination thereof. The service request may be accepted by any one of a passenger, a service requestor, a customer, a driver, a provider, or a service provider. The service request may be chargeable or free.

The term "service provider terminal" and "driver terminal" in the present disclosure are used interchangeably to refer to a mobile terminal that is used by a service provider to provide a service or facilitate the providing of the service. The term "service requestor terminal" and "passenger terminal" in the present disclosure are used interchangeably to refer to a mobile terminal that is used by a service requestor to request or order a service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for determining an estimated time of arrival (ETA) for a route associated with a service request. In some embodiments, the systems and methods may obtain a plurality of example service orders. In some embodiments, each example service order of the plurality of example service orders may include a feature associated with a section of a plurality of sections of a measurement. The systems and methods may cluster the plurality of example service orders into a plurality of subsets of example service orders. In some embodiments, the feature of each example service order in a same subset of example service orders is associated with a same section of the measurement. For example, the systems and methods may cluster the plurality of example service orders into one or more subsets based on the feature (e.g., spatial feature and/or temporal feature). For each of the plurality of subsets of example service orders, the systems and methods may then train a first model for ETA predication (also referred to as the "first ETA model") using the subset. The systems and methods may determine a target ETA related to the service request based on the plurality of first ETA models. For example, the systems and methods may select at least one second ETA model from the plurality of first models. The systems and methods may then determine at least one candidate ETA using the at least one second ETA model. The systems and methods may then determine the target ETA related to the service request based on the at least one candidate ETA (e.g., by determining a weighted average and/or any other combination of the at least one candidate ETA).

It should be noted that the online on-demand transportation service, such as online taxi hailing, is a newly emerged service rooted in post-Internet era. It provides the technical solutions to the passengers and drivers that could raise in post-Internet era. In the pre-Internet era, when a passenger hails a taxi, the passenger may have no knowledge of an estimated time of arrival to a destination or location. If the passenger hails a taxi through a telephone call, it may be difficult for the service provider (e.g., a driver, a taxi company, a post office, a delivery company, or an agent, etc.) to estimate a time arriving the destination for the passenger. Online on-demand transportation system, however, may determine an estimated time of arrival for the passenger based on an ETA model and an intended feature vector obtaining from an intended service request. By training the global feature vector and the historical duration, the online on-demand transportation system may provide the model of ETA for the intended service request. A user such as a passenger or a driver may use the model of ETA to predict the ETA before confirming a service request for a transportation service (e.g., hailing a taxi). The global feature vector for training the model of ETA may be obtained from electrical signal associated with at least one road section. Therefore, through Internet, the online on-demand transportation systems may provide a much more convenient and efficient transaction platform for the passengers and the drivers that may never be met in a traditional pre-Internet transportation service system.

FIG. 1 is a block diagram illustrating an exemplary on-demand service system 100 according to some embodiments. For example, the on-demand service system 100 may be an online transportation service platform for transportation services. The on-demand service system 100 may include a server 110, a network 120, a service requestor terminal 130, a service provider terminal 140, a vehicle 150, a storage device 160, and a navigation system 170.

The on-demand service system 100 may provide a plurality of services. Exemplary service may include a taxi hailing service, a chauffeur service, an express car service, a carpool service, a bus service, a driver hire service, and a shuttle service. In some embodiments, the on-demand service may be any on-line service, such as booking a meal, shopping, or the like, or any combination thereof.

In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the service requestor terminal 130, the service provider terminal 140, and/or the storage device 160 via the network 120. As another example, the server 110 may be directly connected to the service requestor terminal 130, the service provider terminal 140, and/or the storage device 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 1000 having one or more components illustrated in FIG. 10 in the present disclosure.

In some embodiments, the server 110 may include a processing engine 112. The processing engine 112 may process information and/or data related to the service request to perform one or more functions described in the present disclosure. For example, the processing engine 112 may determine an ETA related to a present service request received from the service requestor terminal 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the service requestor terminal 130, the service provider terminal 140, the vehicle 150, the storage device 160, and the navigation system 170) may send information and/or data to other component(s) in the on-demand service system 100 via the network 120. For example, the server 110 may receive a service request from the service requestor terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a passenger may be an owner of the service requestor terminal 130. In some embodiments, the owner of the service requestor terminal 130 may be someone other than the passenger. For example, an owner A of the service requestor terminal 130 may use the service requestor terminal 130 to send a service request for a passenger B, or receive a service confirmation and/or information or instructions from the server 110. In some embodiments, a service provider may be a user of the service provider terminal 140. In some embodiments, the user of the service provider terminal 140 may be someone other than the service provider. For example, a user C of the service provider terminal 140 may use the service provider terminal 140 to receive a service request for a service provider D, and/or information or instructions from the server 110. In some embodiments, "passenger" and "passenger terminal" may be used interchangeably, and "service provider" and "service provider terminal" may be used interchangeably. In some embodiments, the service provider terminal may be associated with one or more service providers (e.g., a night-shift service provider, or a day-shift service provider).

In some embodiments, the service requestor terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc. In some embodiments, built-in device in the vehicle 130-4 may include an onboard computer, an onboard television, etc. In some embodiments, the service requestor terminal 130 may be a device with positioning technology for locating the position of the passenger and/or the service requestor terminal 130.

The service provider terminal 140 may include a plurality of service provider terminals 140-1, 140-2, . . . , 140-n. In some embodiments, the service provider terminal 140 may be similar to, or the same device as the service requestor terminal 130. In some embodiments, the service provider terminal 140 may be customized to be able to implement the online on-demand transportation service. In some embodiments, the service provider terminal 140 may be a device with positioning technology for locating the service provider, the service provider terminal 140, and/or a vehicle 150 associated with the service provider terminal 140. In some embodiments, the service requestor terminal 130 and/or the service provider terminal 140 may communicate with other positioning device to determine the position of the passenger, the service requestor terminal 130, the service provider, and/or the service provider terminal 140. In some embodiments, the service requestor terminal 130 and/or the service provider terminal 140 may periodically send the positioning information to the server 110. In some embodiments, the service provider terminal 140 may also periodically send the availability status to the server 110. The availability status may indicate whether a vehicle 150 associated with the service provider terminal 140 is available to carry a passenger. For example, the service requestor terminal 130 and/or the service provider terminal 140 may send the positioning information and the availability status to the server 110 every thirty minutes. As another example, the service requestor terminal 130 and/or the service provider terminal 140 may send the positioning information and the availability status to the server 110 each time the user logs into the mobile application associated with the online on-demand transportation service.

In some embodiments, the service provider terminal 140 may correspond to one or more vehicles 150. The vehicles 150 may carry the passenger and travel to the destination. The vehicles 150 may include a plurality of vehicles 150-1, 150-2, . . . , 150-n. One vehicle may correspond to one type of services (e.g., a taxi hailing service, a chauffeur service, an express car service, a carpool service, a bus service, a driver hire service, and a shuttle service).

The storage device 160 may store data and/or instructions. In some embodiments, the storage device 160 may store data obtained from the service requestor terminal 130 and/or the service provider terminal 140. In some embodiments, the storage device 160 may store data and/or instructions that the server 110 may execute or use to perform exemplary methods described in the present disclosure. In some embodiments, the storage device 160 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 160 may be connected to the network 120 to communicate with one or more components in the on-demand service system 100 (e.g., the server 110, the service requestor terminal 130, the service provider terminal 140, etc.). One or more components in the on-demand service system 100 may access the data or instructions stored in the storage device 160 via the network 120. In some embodiments, the storage device 160 may be directly connected to or communicate with one or more components in the on-demand service system 100 (e.g., the server 110, the service requestor terminal 130, the service provider terminal 140, etc.). In some embodiments, the storage device 160 may be part of the server 110.

The navigation system 170 may determine information associated with an object, for example, one or more of the service requestor terminal 130, the service provider terminal 140, the vehicle 150, etc. In some embodiments, the navigation system 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The navigation system 170 may include one or more satellites, for example, a satellite 170-1, a satellite 170-2, and a satellite 170-3. The satellites 170-1 through 170-3 may determine the information mentioned above independently or jointly. The satellite navigation system 170 may send the information mentioned above to the network 120, the service requestor terminal 130, the service provider terminal 140, or the vehicle 150 via wireless connections.

In some embodiments, one or more components in the on-demand service system 100 (e.g., the server 110, the service requestor terminal 130, the service provider terminal 140, etc.) may have permissions to access the storage device 160. In some embodiments, one or more components in the on-demand service system 100 may read and/or modify information related to the passenger, service provider, and/or the public when one or more conditions are met. For example, the server 110 may read and/or modify one or more passengers' information after a service is completed. As another example, the server 110 may read and/or modify one or more service providers' information after a service is completed.

In some embodiments, information exchanging of one or more components in the on-demand service system 100 may be initiated by way of requesting a service. The object of the service request may be any product. In some embodiments, the product may include food, medicine, commodity, chemical product, electrical appliance, clothing, car, housing, luxury, or the like, or any combination thereof. In some other embodiments, the product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element of the on-demand service system 100 performs, the element may perform through electrical signals and/or electromagnetic signals. For example, when a service requestor terminal 130 sends out a service request to the server 110, a processor of the service requestor terminal 130 may generate an electrical signal encoding the request. The processor of the service requestor terminal 130 may then send the electrical signal to an output port. If the service requestor terminal 130 communicates with the server 110 via a wired network, the output port may be physically connected to a cable, which further transmit the electrical signal to an input port of the server 110. If the service requestor terminal 130 communicates with the server 110 via a wireless network, the output port of the service requestor terminal 130 may be one or more antennas, which convert the electrical signal to electromagnetic signal. Similarly, a service requestor terminal 130 may receive an instruction and/or service request from the server 110 via electrical signal or electromagnet signals. Within an electronic device, such as the service requestor terminal 130, the service provider terminal 140, and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
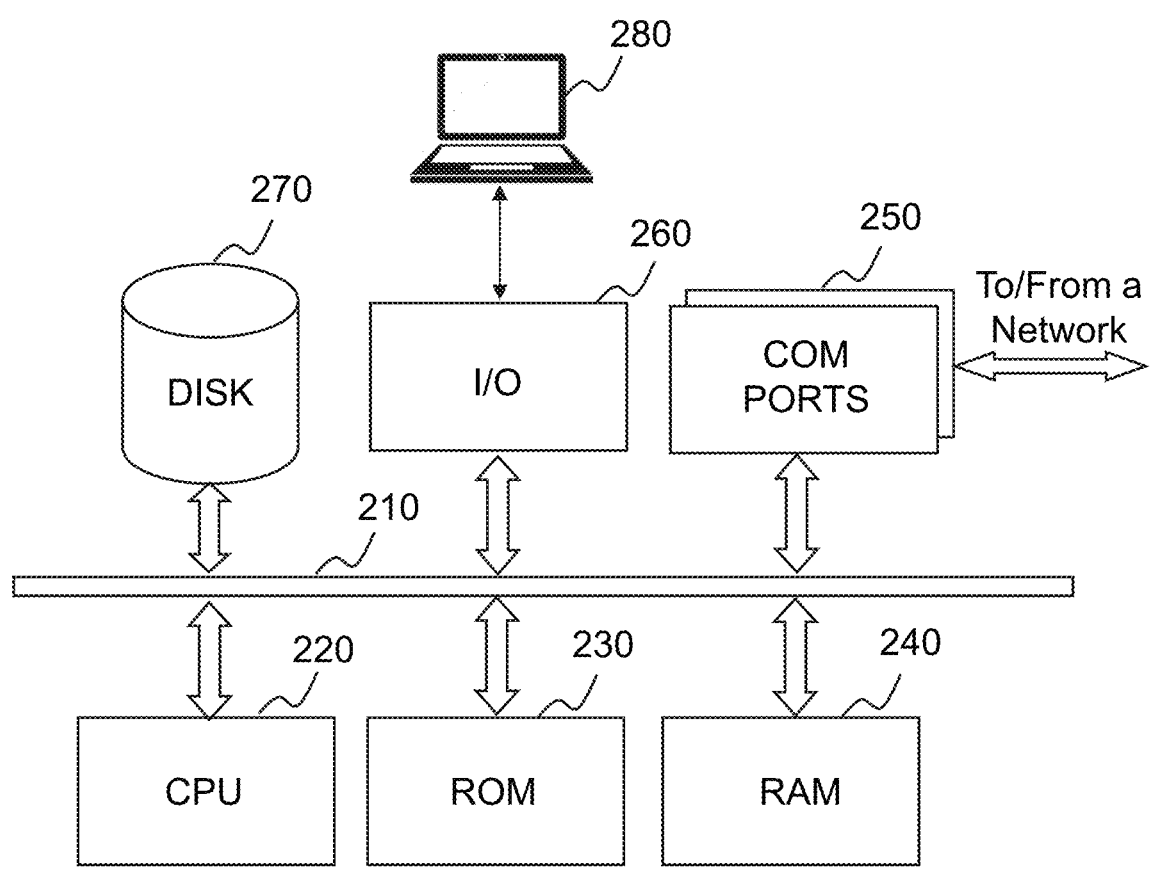
FIG. 2 is a block diagram illustrating exemplary hardware and/or software components of a computing device according to some embodiments of the present disclosure.

FIG. 2 is a schematic diagram illustrating exemplary hardware and software components of a computing device 200 on which the server 110, the service requestor terminal 130, and/or the service provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or any combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220 (or processor 220), in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220 (or processor 220). The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

The CPU 220 (or the processor 220 (e.g., logic circuits)) may be used for executing computer instructions. For example, the CPU 220 (or the processor 220) may include interface circuits and processing circuits therein. The interface circuits may be configured to receive electrical signals from a bus 210, wherein the electrical signals encode structured data and/or instructions for the processing circuits to process. The processing circuits may conduct logic calculations, and then determine a conclusion, a result, and/or an instruction encoded as electrical signals. Then the interface circuits may send out the electrical signals from the processing circuits via the bus 210.

Merely for illustration, only one CPU and/or processor is described in the computing device 200. However, it should be note that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
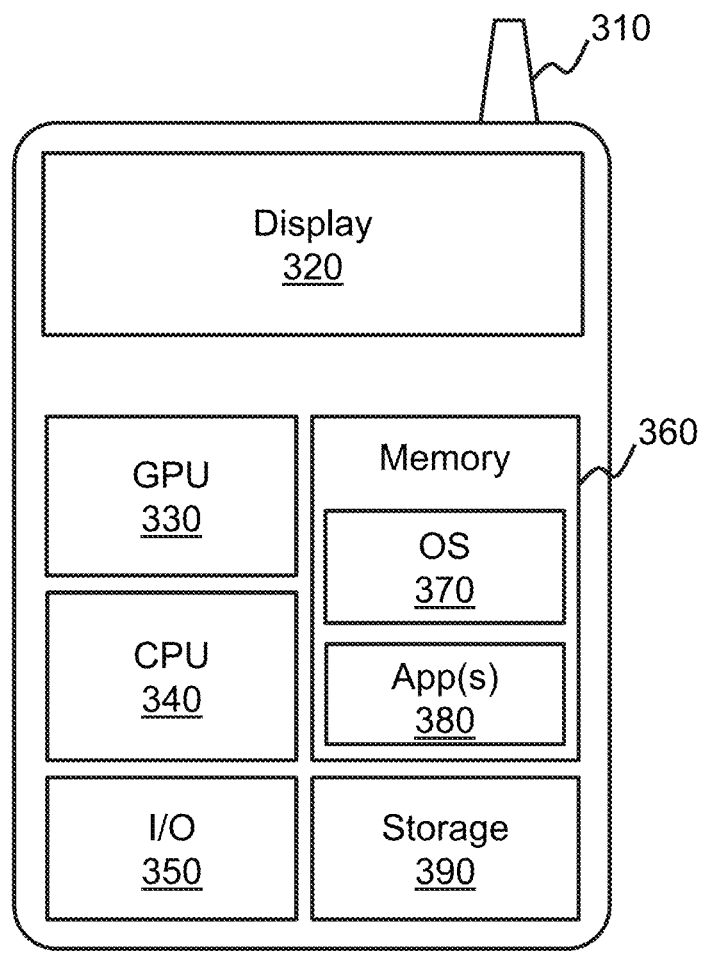
FIG. 3 is a block diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which a use terminal may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 112. User interactions with the information stream may be achieved via the I/O 350 and provided to the processing engine 112 and/or other components of the online on-demand service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
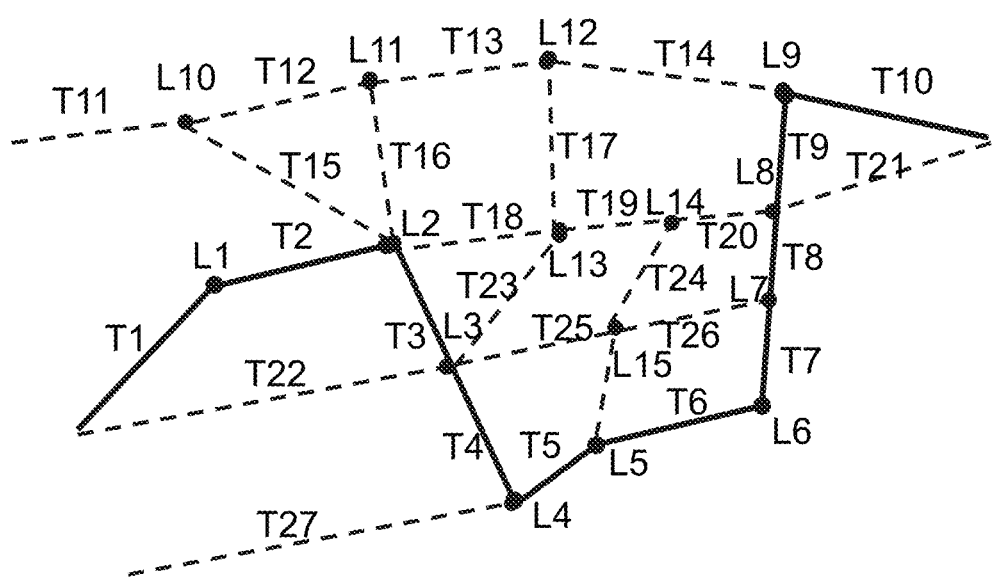
FIG. 4 is a schematic diagram illustrating an exemplary physical model for predicting an ETA according to some embodiments of the present disclosure.

FIG. 4 is a schematic diagram illustrating an exemplary physical model for predicting an ETA according to some embodiments of the present disclosure. The processing engine 112 may determine a route 400 (shown as in FIG. 4 with continuous line) described in a road-based map. Merely by way of example, the route 400 may include 10 road sections (e.g., a first road section, a second road section, . . . , and a tenth road section) and 9 traffic lights ((e.g., a first traffic light, a second traffic light, . . . , and a ninth traffic light). Two adjacent road sections are linked with one or more traffic lights. Time of passing through each of the road sections by a vehicle or other object may be determined based on each of speeds in road sections. For example, the time of passing through the first road section may be determined as T1; the time of passing through the second road section may be determined as T2; . . . ; and the time of passing through the tenth road section may be determined as T10. Time of passing through each of the traffic lights may be determined as L1, L2, . . . , and L9. The processing engine 112 may determine the ETA for the route 400 by adding the times of passing through each of the road sections and the times of passing through each of the traffic lights.

In some embodiments, the processing engine 112 may determine the ETA of the route 400 according to an ETA model. The ETA model may be trained based on data about one or more example service orders. For example, the processing engine 112 may extract one or more feature vectors from the data related to the example service orders. Each of the feature vectors may be associated with one or more features or items of the example service orders including, for example, a start location of a historical order (e.g., also referred to as the "historical start location"), an end location (also referred to as the "historical end location"), a start time of a historical order (also referred to as the "historical start time"), an end time of a historical order (e.g., also referred to as the "historical end time"), the number of traffic lights, a historical duration, or any other features described elsewhere in the present disclosure. The processing engine 112 may then train the model of ETA based on the feature vector(s). As used herein, the term "example service order" may refer to a service request that has been completed at any time (e.g., several years ago, several months ago, several days ago, etc.). The on-demand service system 100 may save this service request as an example service order into a storage component (e.g., the storage device 160). In some embodiments, the model of ETA may be associated with an individual road section, for example, T1, T2, . . . , T10, L1, L2, . . . , L9, and adding all the times to determine an ETA. In some embodiments, the model of ETA may be trained by the feature vector in a global viewpoint (hereinafter referred to as "global feature vector"). For example, it may determine an ETA according to features of the overall route in the road-base map instead of merely considering features of each individual road section.

In some embodiments, any two of the routes may be related to each other. For example, an accident in 5th Avenue of New York may block the traffic thereon. To avoid the traffic on the 5th Avenue, an increasing number of drivers may turn from the 5th Avenue to 138th Avenue of New York. As a large number of vehicles run between 5th Avenue and 138th Avenue, routes in all avenues between 5th Avenue and 138th Avenue may come into a heavy traffic status (e.g., a slow speed).

The processing engine 112 may determine the ETA for the route 400 based on data about the road sections in the route 400 and other road sections in the road-based map. The road sections in the route 400 may be directly or indirectly related to other road sections in the road-based map. For example, a road section corresponding to T22 (shown as in FIG. 4 with dotted line) may have a relationship with the road sections (e.g., the first road section) in the route 400; and a speed in the road section corresponding to T22 may affect the speed in the first road section or any other road section in the route 400. The processing engine 112 may determine the global feature vector based on the road sections in the route and other road sections in the road-based map. The model of ETA trained by the global feature vector may be used to predict the ETA for any route related to a service request in the road-based map shown as in FIG. 4.

FIG. 5-A is a block diagram illustrating an exemplary processing engine 112 according to some embodiments of the present disclosure. The processing engine 112 may include an acquiring module 502, a training module 504, a determination module 506, and a communication module 508. Each module may be a hardware circuit that is designed to perform the following actions, a set of instructions stored in one or more storage media, and/or any combination of the hardware circuit and the one or more storage media.

The acquiring module 502 may be configured to obtain electrical signal encoding data (hereinafter referred to as "data") related to a service request from a terminal. For example, the acquiring module 502 may obtain the data related to the service request from the service requestor terminal 130 via the network 120. The service request may be a request for a transportation service (e.g., a taxi hailing service, a chauffeur service, an express car service, a carpool service, a bus service, a driver hire service, and a shuttle service), a post service, a food order service, etc. The data related to the service request may include a start location, an end location, a route between the start location and the end location, a start time, an end time, fees, or other information related to the service request. In some embodiments, the acquiring module 504 may also obtain electrical signal encoding data related to a plurality of example service orders. In some embodiments, each of the plurality of example service orders may include a feature associated with a section of a plurality of sections of a measurement.

The training module 504 may be configured to generate one or more models for predicting ETAs (also referred to as ETA models). The one or more ETA models may be used to determine an ETA related to one or more service orders obtained by the acquiring module 502. The training module 504 may generated the one or more ETA models based on data relating to one or more example service orders (e.g., the data related to the example service orders provided by the acquiring module 502). For example, the training module 504 may process the data related to the example service orders and determine one or more subsets of the data. In some embodiments, the training module 504 may cluster the data related to the example service orders into the subsets based on one or more features related to the example service orders. Each of the subsets may correspond to, for example, one or more particular features (e.g., spatial features, temporal features). The training module 504 may then determine one or more ETA models based on the subsets. For example, the training module 504 may extract one or more global feature vectors and/or historical durations from the plurality of subsets to train a plurality of ETA models accordingly. The plurality of ETA models may be transmitted to the determination module 506 or may be stored in any storage component (e.g., the storage device 160) disclosed elsewhere in the present disclosure.

The determination module 506 may be configured to determine a target ETA relating to the service request based on the plurality of ETA models. For example, the determination module 506 may determine at least one candidate ETA based on the data related to the service request and the plurality of ETA models. The determination module 506 may determine the target ETA relating to the service request based on a combination of the at least one candidate ETA according to some algorithms or functions. As another example, the determination module 506 may generate an integrated ETA model according to some algorithms or functions. Then the integrated ETA model may be used to determine the target ETA relating to the service request. The target ETA may be stored in any storage component (e.g., the storage device 160) disclosed elsewhere in the present disclosure.

The communication module 508 may be configured to transmit the target ETA relating to the service request to at least one service requestor terminal 130 and/or the service provider terminal 140 to be displayed. In some embodiments, the target ETA may be displayed on the at least one terminal via a user interface (not shown). In some embodiments, the target ETA may be displayed in a format of, for example, text, images, audios, videos, etc. In some embodiments, the communication module 508 may transmit the target ETA to the at least one terminal via a suitable communication protocol (e.g., the Hypertext Transfer Protocol (HTTP), Address Resolution Protocol (ARP), Dynamic Host Configuration Protocol (DHCP), File Transfer Protocol (FTP), etc.).

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, any two of the modules may be combined as a single module, and any one of the modules may be divided into two or more units.

FIG. 5-B is a block diagram illustrating an exemplary determination module according to some embodiments of the present disclosure. As shown in FIG. 5-B, the determination module 506 may include a time interval determination unit 510, a geographic region determination unit 512, and an ETA determination unit 514. Each unit may be a hardware circuit that is designed to perform the following actions, a set of instructions stored in one or more storage media, and/or any combination of the hardware circuit and the one or more storage media.

The time interval unit 510 may be configured to determine a time interval corresponding to one or more service requests. The time interval unit may determine the time intervals based on start times and/or end times associated with the one or more example service orders and/or present service requests.

The geographic region determination unit 512 may be configured to determine a geographic region corresponding to one or more service requests. For example, the geographic region determination unit 512 may determine the geographic region based on start locations, intermediate locations (e.g., locations between a start location and an end location), end locations, and/or routes between the start locations and the end locations associated with the one or more example service orders and/or present service requests, etc.

The ETA determination unit 514 may be configured to determine an ETA related to a present service request based on at least one model of ETA. The ETA determination unit 514 may determine at least one ETA based on the at least one model of ETA. The ETA determination unit 514 may determine the ETA related to the present service request based on the at least one ETA.

The units in the determination module 506 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, any two of the units may be combined as a single unit, and any one of the units may be divided into two or more sub-units.

FIG. 6-A is a flowchart illustrating an exemplary process 600A for determining an ETA model according to some embodiments of the present disclosure. The process 600A may be executed by the online on-demand service system 100. For example, the process 600A may be implemented as a set of instructions (e.g., an application) stored in the storage device 160. The processing engine 112 may execute the set of instructions and may accordingly be directed to perform the process 600A in an online on-demand service platform via receiving and/or sending electrical signals. The platform may be an Internet-based platform that connects on-demand service providers and requestors through Internet.

In 602, the processing engine 112 may obtain a plurality of example service orders. The processing engine 112 may obtain the plurality of example service orders from the storage device 160 or any component in the online on-demand service system 100. In some embodiments, the plurality of example service orders may be obtained from user terminals (e.g., the service requestor terminal 130 or the service provider terminal 140). For example, the processing engine 112 may obtain the plurality of example service orders from a driver terminal or a passenger terminal by analyzing requests, service requests, transactions, navigation information, electronic map in user terminal, or the like, or any combination thereof.

The on-demand service system 100 may save the plurality of example service orders into a storage component (e.g., the storage device 160). In some embodiments, the plurality of example service orders may include historical start locations, historical end locations, historical start times, historical routes between the historical start locations, and/or historical durations. The historical start location may be a location where a passenger has been picked up, or a location for a passenger to wait a driver. The historical end location may be a place where a service provider dropped off a passenger. The historical duration may be the time expended in which a service provider drove a passenger from the historical start location to the historical end location associated with an example service order.

In some embodiments, each example service order of the plurality of example service orders may include a feature associated with a section of a plurality of sections of a measurement. The measurement may include parameter such as time, a location coordinate, etc. In some embodiments, each section may include a predetermined time period. The predetermined time period may be associated with a historical start time, a historical end time, and/or a historical duration of an example service order of the plurality of example service orders. The feature includes at least one of a start time or an end time associated with an example service order of the plurality of example service orders. In some embodiments, each section of the plurality of sections of the measurement may include a predetermined section of geographical area. The location coordinate may be, for example, a two dimensional coordinate including an x direction and a y direction. The location coordinate may be associated with a historical start location, historical locations that passed through, and/or a historical end location of an example service order of the plurality of example service orders. The feature may include at least one of a start location or an end location associated with an example service order of the plurality of example service orders. Each section may also include the predetermined time period and the predetermined section of geographical area.

The features associated with the plurality of example service orders may include a plurality of first temporal features (e.g., measurement of time) and/or a plurality of first spatial features (e.g., measurements of location coordinates). The plurality of first temporal features may be indicative of a plurality of time intervals in which the plurality of example service orders have been initiated by a requestor and/or completed by a service provider. The processing engine 112 (e.g., the time interval determination unit 510) may determine each of the plurality of first temporal features based on at least one of a historical start time, a historical end time, and/or a historical duration associated with at least one of the plurality of example service orders. For example, the processing engine 112 may determine a portion of the plurality of example service orders initiated and/or completed in each of the plurality of time intervals. If the historical start times and/or the historical end times of the plurality of example service orders are from one day, the time intervals may be 0 to 1 a.m., 1 a.m. to 2 a.m., 2 a.m. to 3 a.m., . . . , 22 p.m. to 23 p.m., and/or 20 p.m. to 0. Merely by way of example, if an example service order starts at 9:35 p.m. and ends at 10:20 p.m., it may be regarded as belonging to a time interval of 9 p.m. to 10 p.m. according to the start time, or regraded as belonging to a time interval of 10 p.m. to 11 p.m. according to the end time. In some embodiments, the processing engine 112 may choose one time interval or distribute the example service order into two time intervals simultaneously.

It should be noted the above description of the time interval is merely illustrative and not intended to limit the scope of the present disclosure. The length of each of the plurality time intervals may be the same or different. For example, the lengths of each of the plurality of time intervals may be 0.5 hours, 1 hours, 1.5 hours, 1.8 hours, etc. As another example, two adjacent time intervals may be overlapping or successive.

The plurality of first spatial features may be indicative of a plurality of geographic regions (e.g., a plurality of location coordinates) associated with the plurality of example service orders. The processing engine 112 (e.g., the geographic region determination unit 510) may determine each of the plurality of first spatial features based on at least one of a historical start location, historical locations that passed through, and/or a historical end location associated with at least one of the plurality of example service orders. The size of a geographic region may include but is not limited to a route, a community, a district, a city, a state, a province, or the like, or any combination thereof. The size of different geographic regions may be the same or different. In some embodiments, the processing engine 112 may determine a portion of the plurality of example service orders initiated and/or completed in each of the plurality of the geographic regions.

In 604, the processing engine 112 (e.g., the determination module 506, the time interval determination unit 510, the geographic region determination unit 510, etc.) may cluster the plurality of example service orders into a plurality of subsets of example service orders. The feature of each example service order in a same subset of example service orders may be associated with a same section of the measurement. The time and/or location coordinate associated with the measurement may form a plurality of sections of the measurement. Each section may correspond to a time interval (i.e. a predetermined time period) and/or a location coordinate.

As described in connection with step 602, the processing engine 112 may determine the plurality of subsets based on the plurality of first temporal features and/or the plurality of first spatial features. To determine each of the subsets, the processing engine 112 may determine a first time interval from the plurality of time intervals associated with the plurality of first temporal features. The processing engine 112 may select a first portion of the plurality of example service orders that were initiated and/or completed in the first time interval. The processing engine 112 may determine data related to the first portion of the plurality of example service orders as the each subset. For example, the processing engine 112 may determine data related to the first portion of the plurality of example service orders initiated and/or completed between 22 p.m. to 23 p.m. as a subset. Accordingly, the subset may correspond to the section of 22 p.m. to 23 p.m.

In some embodiments, the processing engine 112 may determine a first geographic region associated with a location coordinate from the plurality of geographic regions associated with the plurality of first spatial features. The processing engine 112 may select a second portion of the plurality of example service orders that were initiated and/or completed in the first geographic region. The processing engine 112 may determine data related to the second portion of the plurality of example service orders as the each subset. For example, the processing engine 112 may determine data related to the second portion of the plurality of example service orders initiated and/or completed in Beijing City as a subset. Accordingly, the subset may correspond to the section of Beijing.

In some embodiments, the processing engine 112 may determine the each subset based on both the plurality of first temporal features and the plurality of first spatial features. The processing engine 112 may determine a third portion of the plurality of example service orders that were initiated and/or completed in a time interval and in a geographic region. For example, for determining the each subset, the processing engine 112 may select a third portion of the plurality of the example service orders corresponding to the first time interval and the first geographic region. The process engine 112 may determine data related to the third portion of the plurality of example service orders as the each subset. For example, the processing engine 112 may determine data related to the third portion of the plurality of example service orders initiated and/or completed between 22 p.m. to 23 p.m. and in Beijing City as a subset. Accordingly, the subset may correspond to the section of 22 p.m. to 23 p.m. and Beijing.

In some embodiments, the processing engine 112 may determine a plurality of global feature vectors and historical durations based on each of the plurality of subsets. For each example service orders associated with each of the plurality of the subsets, the processing engine 112 may determine structured data of a global feature vector and structured data of historical duration associated with the example service order. The structured data of a global feature vector and/or the structured data of historical duration may be constructed or retrieved by the processing engine 112 based on a B-tree, a hash table, etc. In some embodiments, the structured data may be stored or saved in a form of a data library in the storage device 160. The global feature vector and the historical durations may be used to generate a plurality of training samples. The plurality of training samples may form a training set that may be used to discover potentially predictive relationships or establish a model for prediction.

In some embodiments, the global feature vector may include a plurality of items or features including, for example, traffic status, driving distance, start time, start location, end location, sequence of satellite positioning sampling points, driving distance on a specified level of road, number of road sections, number of crossroads with traffic lights, number of crossroads without traffic lights, vehicle status, or the like, or any combination thereof. The traffic status may include a real-time road speed, or an estimated road speed. The driving distance may include total distance of the historical route, or distance in each of the road sections. The start time may include a time that a passenger has been picked up, or a time that a user (e.g., a driver) has received or confirmed a service request. The historical start location may be a location where a passenger has been picked up, or a location for a passenger to wait a driver. The sequence of satellite positioning sampling points may be a sequence including vehicle positions. The vehicle positions may be determined by a satellite (e.g., via a GPS system). The driving distance on a specified level of road may be a distance that a vehicle drives on a specified level of road, such as a highway, a local road, a first-class road, a second-class road, a third-class road, etc. The number of road sections may be a total number of the road sections in one route. The vehicle status may include an access status (e.g., availability to accept the service request.) to the transportation service request, a response probability, a preference of a driver, a vehicle type, a current number of passengers in the vehicle, a maximum passenger capacity of the vehicle, a color of the vehicle, a service level of the driver, a current speed of the vehicle, or the like, or any combination thereof.

In some embodiments, the global feature vector may be expressed as a vector with one column or one row. For example, the global feature vector may be a row vector expressed as a 1×N determinant (e.g., a 1×25 determinant). As another example, the global feature vector may be a column vector that may be expressed as an N×1 determinant (e.g., a 200×1 determinant). In some embodiments, the global feature vector may correspond to an N-dimensional coordinate system. The N-dimensional coordinate system may be associated with N items or features of the routes. In some embodiments, one or more global feature vectors may be processed by the processing engine 112. For example, three global features vectors (e.g., three row vectors) may be integrated into a 3×N determinant. As another example, N global feature vectors (e.g., N 1×N row vectors) may be integrated into an N×N determinant. The global feature vector may be described in detail with connection to FIG. 7.

In 606, the processing engine 112 may, for each of the plurality of subsets of example service orders, train a first model of estimated time of arrival (first ETA model) using the subset of example service orders. The processing engine 112 may generate structured data of the plurality of first ETA models using the plurality of subsets. More particularly, for example, as described in connection with step 604, the processing engine 112 may determine the plurality of first ETA models based on the plurality of global feature vectors and the structure data of the historical durations associated with the each of the plurality of the subsets.

In some embodiments, the processing engine 112 may use a machine learning method to determine the ETA model. For example, the processing engine 112 may train an ETA model using the subsets as training data. In some embodiments, the machine learning method may include a decision tree algorithm, an association rule algorithm, an artificial neural networks algorithm, a deep learning algorithm, an inductive logic programming algorithm, a support vector machines algorithm, a clustering algorithm, a Bayesian networks algorithm, a reinforcement learning algorithm, a representation learning algorithm, a similarity and metric learning algorithm, a sparse dictionary learning algorithm, a genetic algorithms, a rule-based machine learning algorithm, or the like, or any combination thereof.

In some embodiments, the processing engine 112 may use a decision tree algorithm to determine an ETA model. The decision tree algorithm may include an iterative dichotomiser 3 algorithm, classification and regression tree algorithm, successor of ID3 algorithm, CHi-squared automatic interaction detector algorithm, conditional inference trees algorithm, or the like, or any combination thereof.

In some embodiments, the processing engine 112 may determine one or more accuracy scores for the first ETA models and may associate the accuracy scores with the first ETA models. Each of the accuracy scores may represent predication accuracy and/or a prediction error of one or more of the first ETA models. Each of the accuracy scores may include one or more numbers, symbols, characters, etc. that may represent predication accuracy and/or predication error. For example, each of the accuracy scores may include one or more numerical values indicative of a predication error related to an ETA generated using a model. As another example, each of the accuracy scores may include a rating scale (e.g., 1, 2, 3, a, b, c). In some embodiments, the processing engine 112 may determine an accuracy score for each of the first ETA models. For example, for each example service orders associates with a subset, the processing engine 112 may determine a predicted duration based on a first ETA model corresponding to the subset. The processing engine 112 may determine a difference between the predicted duration and the historical duration associated with the each example service orders. The difference may be determined according to different algorithms including, for example, mean absolute percent error (MAPE), mean squared error (MSE), root mean square error (RMSE), or the like, or any combination thereof. Merely by way of example, the processing engine 112 may determine the accuracy score associates with the first ETA model corresponding to the subset based on the MAPE based on equation (1):

$$MAPE = \frac{|t_p - t_r|}{t_r} \cdot 100\%, \tag{1}$$

where $t_r$ represents historical duration associated with an example service order; and $t_p$ represents the predicted duration.

In 608, the processing engine 112 may store structured data in the at least one storage medium encoding the plurality of first ETA models. The structured data of an ETA model may be constructed or retrieved by the processing engine 112 based on a B-tree or a hash table. In some embodiments, the structured data may be stored as a form of a data library in the storage device 160.

FIG. 6-B is a flowchart illustrating an exemplary process 600B for determining a target ETA for a service request according to some embodiments of the present disclosure. The process 600B may be executed by the online on-demand service system 100. For example, the process 600B may be implemented as a set of instructions (e.g., an application) stored in the storage device 160. The processing engine 112 may execute the set of instructions and may accordingly be directed to perform the process 600B in an online on-demand service platform via receiving and/or sending electrical signals. The platform may be an Internet-based platform that connects on-demand service providers and requestors through Internet.

In 610, the processing engine 112 may obtain a present service request including the feature. The processing engine 112 may determine second electrical signal encoding data (hereinafter referred to as "second data") associated with the present service request. The processing engine 112 may obtain the second data associated with a present service request from the service requestor terminal 130 via the network 120. The present service request may be a request for a transportation service (e.g., a taxi hailing service, a chauffeur service, an express car service, a carpool service, a bus service, a driver hire service, and a shuttle service), a post service, a food order service, etc. The processing engine 112 may determine the feature based on the second data (e.g., also referred to as the "second feature"). The second feature may be associated with time and/or location coordinate associated with the present service request. In some embodiments, the processing engine 112 may determine the second feature based on a start location, an end location, a start time, and/or a route between the start location and the end location related to the present service request. The second feature may include a second temporal feature and/or a second spatial feature. For example, the second temporal feature may be associated with a time interval. As another example, the second spatial feature may be associated with a geographic region including the start location, the end location, and/or a route between the start location and the end location.

The present service request may refer to a request sent by a service requestor a moment ago via a service requestor terminal 130. The processing engine 112 may determine an ETA related to the present service request and send data related to the ETA to the service requestor terminal 130. The processing engine 112 may also send the data related to the ETA to at least one service provider terminal 140.

In some embodiments, the route related to the present service request may include at least one road section. The plurality road sections may include road sections between two traffic lights, road sections between different levels of roads, road sections linked by a bridge, road sections separated by a river, road sections divided by a railway track, road sections with a fixed distance (e.g., one mile, or two kilometers), road sections among different administrative regions (e.g., different cities, different provinces, or different countries), road sections corresponding to each of pickups of passengers, any road sections with the same or different road properties, or the like, or any combination thereof.

In some embodiments, the processing engine 112 may determine a second global feature vector based on the second data associated with the present service request. In some embodiments, as described in connection with the first global feature vector in 604, the second global feature vector may have N dimensions, where N may correspond to N items or features obtained from the second data. For example, if the processing engine 112 may select 2000 items or features from the second data, a vector including 2000 columns or 2000 rows may be determined as the second global feature vector for the second data.

In some embodiments, dimensions of the second global feature vector may be less than that of the global feature vector. If one or more items or features in the second data are missed, the dimension of the second global feature vector corresponding to the second data may decrease, and the second global feature vector with deceased dimension (e.g., a vector with R columns or R rows, where R may be less than N). In some embodiments, if one or more items or features in the second data are missed, the processing engine 112 may determine the second global feature vector still with N columns or N rows; and columns or rows corresponding to the missing items may be described by a default value (e.g., a null).

In 612, the processing engine 112 (e.g., the ETA determination unit 514) may determine a target section of the plurality of sections of the measurement associated with the feature of the service request. In some embodiments, the processing engine 112 may determine the target section associated with the feature of the service request based on the second temporal feature and/or the spatial feature. For example, the target section may correspond to the start time associated with the present service request. As another example, the target section may correspond to the geographic region including the start location, the end location, and/or a route between the start location and the end location associated with the present service request. As still another example, the target section may correspond to the start time and the geographic region associated with the present service request.

In step 614, the processing engine 112 may select, from the plurality of first ETA models, at least one second ETA model. The processing engine 112 may determine the at least one second ETA model based on the plurality of first ETA models and the second data associated with the present service request (e.g., the start time, the start location, the end location, the second global feature vector associates with the present service request, the accuracy scores of the plurality of first ETA models, etc.).

In some embodiments, the processing engine 112 may select, from the plurality of first ETA models, at least one second ETA model (also referred to as the "selected ETA model") from the plurality of first models based on a selection mechanism. For example, the processing engine 112 may make the selection based on the accuracy scores associated with the first ETA models. More particularly, for example, the processing engine 112 may select one or more first ETA models associated with particular accuracy scores as the at least one second model. In some embodiments, the processing engine 112 may select one or more first ETA models associated with accuracy scores that are greater than a threshold as the at least one second model. In some embodiments, the processing engine 112 may rank the first ETA models based on the accuracy scores and select a certain number of first models based on the ranking (e.g., the top five first models, top 10% of the first ETA models) the at least one second model.

In some embodiments, the processing engine 112 may determine at least one second ETA model from the plurality of first ETA models based on the accuracy scores. The processing engine 112 may rank the plurality of first ETA models based on the accuracy scores. The processing engine 112 may determine a ranking result. The ranking result may include any information about rankings of the plurality of first ETA models by accuracy scores (e.g., the highest accuracy score, the second highest accuracy score, the lowest accuracy score, etc.). The processing engine 112 may determine the at least one second ETA model based on the ranking result. For example, the processing engine 112 may identify a first accuracy score (e.g., the highest accuracy score, the second highest accuracy score, the lowest accuracy score, etc.) of the accuracy scores based on the ranking result. The processing engine 112 may select, from the plurality of first ETA models, at least one first ETA model associated with the first accuracy score (e.g., the highest accuracy score, the second highest accuracy score, the lowest accuracy score, etc.) as the at least one second ETA model.

As another example, the processing engine 112 may select, from the plurality of first ETA models, the at least one second ETA model based on the target section. As described in connection with step 606, the at least one second ETA model may correspond to the target section.

In some embodiments, the processing engine 112 may compare the second spatial feature to determine whether the second spatial feature matches at least one of the first spatial features. For example, the processing engine 112 may identify a first spatial feature that matches the second spatial feature and may select the at least one second ETA model corresponding to the identified spatial feature.

In some embodiments, the processing engine 112 may determine the start location, intermediate locations (e.g., locations between a start location and an end location), and/or the end location based on the second data. The processing engine 112 (e.g., the geographic region determination unit 510) may determine a plurality of first geographic regions, based on the start location, the location that passed through, and/or the end location from the plurality of geographic regions as described in connection with step 602. The processing engine 112 may determine a second geographic region including the start location, the location that passed through, and/or the end location associated with the present service request. The processing engine 112 may determine that the second geographic region associated with the present service request matches at least one of the plurality of first geographic regions. For example, the second geographic region associated with the present service request and at least one of the plurality of first geographic regions may be the same or overlapping.

In some embodiments, the processing engine 112 may determine that the at least one of the plurality of first geographic regions may be Beijing City, the processing engine 112 may determine a first ETA model corresponding to Beijing City as the at least one second ETA model. Accordingly, the target section may correspond to Beijing City.

In some embodiments, the processing engine 112 may compare the second temporal feature to determine whether the second temporal feature matches at least one of the first temporal features. For example, the processing engine 112 may identify a first temporal feature that matches the second temporal feature and may select the at least one second ETA model corresponding to the identified temporal feature. In some embodiments, the processing engine 112 may determine the start time based on the second data. The processing engine 112 (e.g., the time interval determination unit 510) may determine, based on the start time, a plurality of second time intervals from the plurality of time intervals as described in connection with step 602. For example, the processing engine 112 may identify the plurality of second time intervals that match the start time. The start time may be located in at least one of the plurality of second time intervals or at a predetermined time close to at least one of the plurality of second time intervals. The predetermined time may be default settings or adjusted in different conditions. The predetermined time may be any time span, such as 5 minutes, 10 minutes, 30 minutes, 1 hour, 2 hours, 3 hours, etc.

In some embodiments, the processing engine 112 may determine that the start time of the present service request is between 7 p.m. and 8 p.m., the processing engines 112 may determine three first ETA models corresponding to three time intervals including 6 p.m. to 7 p.m., 7 p.m. to 8 p.m., and 8 p.m. to 9 p.m. as the at least one second ETA model. As another example, if the start time of the present service request is between 7 p.m. and 8 p.m., the processing engines 112 may determine three first ETA models corresponding to three time intervals including 7 p.m. to 8 p.m. on last three Mondays as the at least one fifth ETA model. Accordingly, the target section may correspond to the time interval between 7 p.m. and 8 p.m. The processing engine 112 may determine the at least one second ETA model based on one or more adjacent sections with respect to the target section.

In some embodiments, the processing engine 112 may determine that the second temporal feature matches at least one of the first temporal features and that the second spatial feature matches at least one of the first temporal features. Then processing engine 112 may determine the at least one second ETA model based on the determination. For example, the processing engine 112 may select the ETA model that corresponds to the matching first spatial feature(s) and first temporal feature(s). In some embodiments, the processing engine 112 may determine the at least one second ETA model from the plurality of first ETA models based on one or more combinations of the start time, the start location, the location that passed through, and/or the end location associated with the present service request. The processing engine 112 (e.g., the time interval determination unit 510, the geographic region determination unit 510, etc.) may determine a plurality of third time intervals from the plurality of time intervals and a plurality of third geographic regions from the plurality of geographic regions based on the one or more combinations. The processing engine 112 may determine the at least one second ETA model from the plurality of first ETA models based on the plurality of third time intervals and the plurality of third geographic regions. For example, the processing engine 112 may determine three first ETA models corresponding to three time intervals including 6 p.m. to 7 p.m., 7 p.m. to 8 p.m., and 8 p.m. to 9 p.m. and corresponding to Beijing City as the at least one second ETA model. Accordingly, the target section may correspond to the time interval between 7 p.m. and 8 p.m. and Beijing City. The processing engine 112 may determine the at least one second ETA model based on one or more adjacent sections with respect to the target section.

In 616, the processing engine 112 (e.g., the ETA determination unit 514) may determine a target ETA for the present service request based on the at least one second ETA model. Merely by way of example, when three first ETA models are selected as the at least one second ETA model, the processing engine 112 may combine the three first models by designating three corresponding weights to them to generate the integrated model.

The processing engine 112 may determine the second global feature vector as an input for the at least one second ETA model. The at least one second ETA model may determine an output according to the input. For example, if a driver send a present service request for a taxi to the online on-demand service system 100, data related to the present service request may be determined. The processing engine 112 may determine the second global feature vector with N dimensions according to the data related to the present service request. The processing engine 112 may further determine the ETA for the present service request by inputting the second global feature vector into the at least one second ETA model. In some embodiments, the step 612 may be implemented in an electronic device such a smartphone, a personal digital assistant (PDA), a tablet computer, a laptop, a carputer (board computer), a play station portable (PSP), a smart glasses, a smart watch, a wearable devices, a virtual display device, display enhanced equipment (e.g. a Google™ Glass, an Oculus Rift, a HoloLens, or a Gear VR), or the like, or any combination thereof.

In some embodiments, the processing engine 112 (e.g., the ETA determination unit 514) may determine a target ETA related to the present service request based on the at least one second ETA model. The processing engine 112 may determine at least one candidate ETA based on the at least one second ETA model and the second data associated with the present service request. The processing engine 112 may determine the target ETA related to the present service request based on a combination of the at least one candidate ETA (e.g., multiple candidate ETAs generated using one or more of the first ETA models and/or the at least one second ETA models). In some embodiments, the combination of the candidate ETAs may be determined by applying a weight to one or more of the candidate ETAs. For example, the ETA related to the present service request may be a weighted average of the at least one candidate ETA, a weighted mean of the at least one candidate ETA, etc.

In 618, the processing engine 112 may send the target ETA to a requestor of the present service request. For example, the processing engine 112 may send the target ETA to a terminal corresponding to the requestor. The terminal may be a service requestor terminal 130 or a service provider terminal 140. The processing engine 112 may send the target ETA to the at least one terminal in a form of text, pictures, audio, video, etc. In some embodiments, the ETA may be displayed on the at least one service provider terminal 140.

FIG. 7 is a table associated with an exemplary global feature vector according to some embodiments of the present disclosure. The processing engine 112 may obtain data related to one or more example service orders from a driver terminal. In some embodiments, the data related to one or more service requests may be transmitted as an electrical signal. The data related to one or more example service orders may include text data, numeral data, image data, video data, voice data, and/or categorical data. The processing engine 112 may transform the text data, image data, video data, voice data, and categorical data into numeral data. The processing engine 112 may further construct global feature vectors and historical durations based on the numeral data associated with the one or more service requests.

For example, the processing engine 112 may obtain the data associated with three routes that are denoted 3 route IDs: 1, 2, and 3, respectively (shown as in 710). The three routes may be associated with three example service orders. Each of the data associated with route IDs may include driving distance 720, number of traffic lights 730, road width 740, time interval of a start time 750, region of a start location 760, and historical duration 770 corresponding to variable names X1, X2, x3, X4, Xn, respectively. The processing engine 112 may construct a global feature vector based on each of the data. Items or features in the global feature vector may include the driving distance 720, the number of traffic lights 730, the road width 740, time interval of a start time 750, and region of a start location 760. The processing engine 112 may further transform the text data and/or categorical data (e.g., a taxi, or a private car, etc.) in the global feature vector into the numeral data. For example, the time interval of a start time 750 may be designated by a mean value. Then the time interval of the IDs 1, 2, and 3 may be 7.5, 8.5, and 9.5. As another example, the region of a start location 760 may be designated by different values, e.g., A=1, B=6.5, and C=4. In some embodiments, before training an ETA model, the processing engine 112 may transform the numeral data in the global feature vector into binary data. As described in FIG. 7, several exemplary global feature vectors may be determined with a form of g=(X1, X2, X3, X4, Xn). For example, the global feature vector of the ID 1 may be g1=(3, 2, 12, 7.5, 1), the global feature vector of the ID 2 may be g2=(0.7, 0, 10, 8.5, 6.5), and the global feature vector of the ID 3 may be g3=(12, 6, 10, 9.5, 4). Each global feature vector may correspond to one historical duration in 770. The historical duration may be used as a label to train a model. The global feature vectors and corresponding historical durations may form a training set. The processing engine 112 may train an ETA model by determining the global feature vector as an input and determining a predicted duration as an output. The processing engine 112 may determine predictive accuracy of the trained ETA model based on the predicted duration and the historical duration (e.g., by determining an accuracy score).

Figure 8:
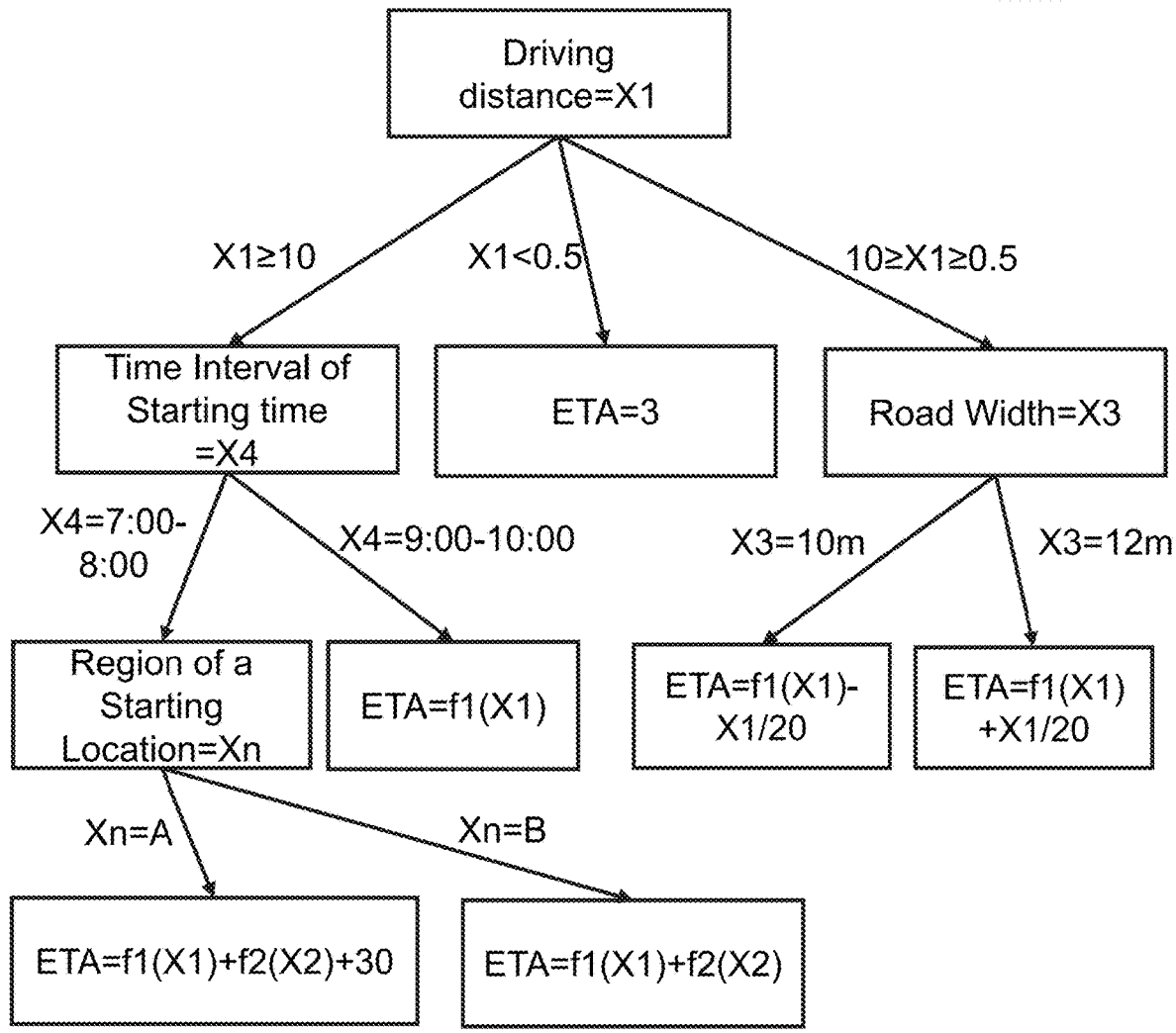
FIG. 8 is a schematic diagram illustrating an exemplary decision tree as an ETA model according to some embodiments of the present disclosure.

FIG. 8 is a schematic diagram of an exemplary decision tree as an ETA model according to some embodiments of the present disclosure. The decision tree may include a classification tree, a regression tree, or a classification and regression tree. Algorithm used in constructing the decision tree may include an iterative dichotomiser 3 algorithm, classification and regression tree algorithm, successor of ID3 algorithm, CHi-squared automatic interaction detector algorithm, or conditional inference trees algorithm. During constructing the decision tree 800, the processing engine 112 may use information gain to determine which variable or item may be decided first in the decision tree 800. The information gain may be expressed as formula (2):

$$\text{Gain}=\text{infobeforesplit}-\text{infoaftersplit}, \quad (2)$$

where the Gain represents the gain information; infobeforesplit represents entropy before splitting; and infoaftersplit represents entropy after splitting.

The entropy may be expressed as formula (3):

$$H(T)=-\Sigma_{i-1}^{n} P_i \cdot \log_2 P_i, \quad (3)$$

where H(T) represents entropy for variable T with n values; and Pi represents probability when T is i.

For example, the processing engine 112 may determine information gain for each of variables (e.g., driving distance, time interval of a start time, road width, and region of a start location). The processing engine 112 may select a variable (e.g., the driving distance) with the largest information gain. The processing engine 112 may determine the driving distance as a first split to contrast the decision tree 800. Other variables such as time interval of a start time, a road width, and a region of a start location, may be split based on corresponding information gain respectively. As shown in FIG. 8, the decision tree 800 may be split first using the driving distance. If the driving distance is equal to or greater than 10, the decision tree 800 may be further split by the time interval of a start time. If the time interval of a start time is between 7 a.m. and 8 a.m., the decision tree 800 may be further split by the region of a start location. If the region of start location is B, the ETA may be calculated by formula (4):

$$\text{ETA}=f1(X1)+f2(X2), \quad (4)$$

where f1 represents a function of the driving distance; and f2 represents a function of the time interval of a start time. If the region of start location is A, the ETA may be calculated by formula (5):

$$ETA = f1(X1) + f2(X2) + 30, \quad (5)$$

where f1 represents a function of the driving distance; and f2 represents a function of the time interval of a start time.

If the driving distance is equal to and greater than 0.5 kilometers, and equal to and less than 10 kilometers, the decision tree 800 may be further spit by the road width, for example, if the road width is equal to 10 meters, the ETA may be calculated by formula (6):

$$ETA = f1(X1) - X1/20, \quad (6)$$

where f1 represents a function of the driving distance. If the road width is equal to 12 meters, the ETA may be calculated by formula (7):

$$ETA = f1(X1) + X1/20, \quad (7)$$

where f1 represents a function of the driving distance.

If the driving distance is less than 0.5 kilometers, the ETA may be 3 minutes. In some embodiments, the decision tree 800 may output a number based on one of the formula descriptions. For example, the decision tree 800 may output the ETA as 32 minutes based on the formula (7).

Figure 9:
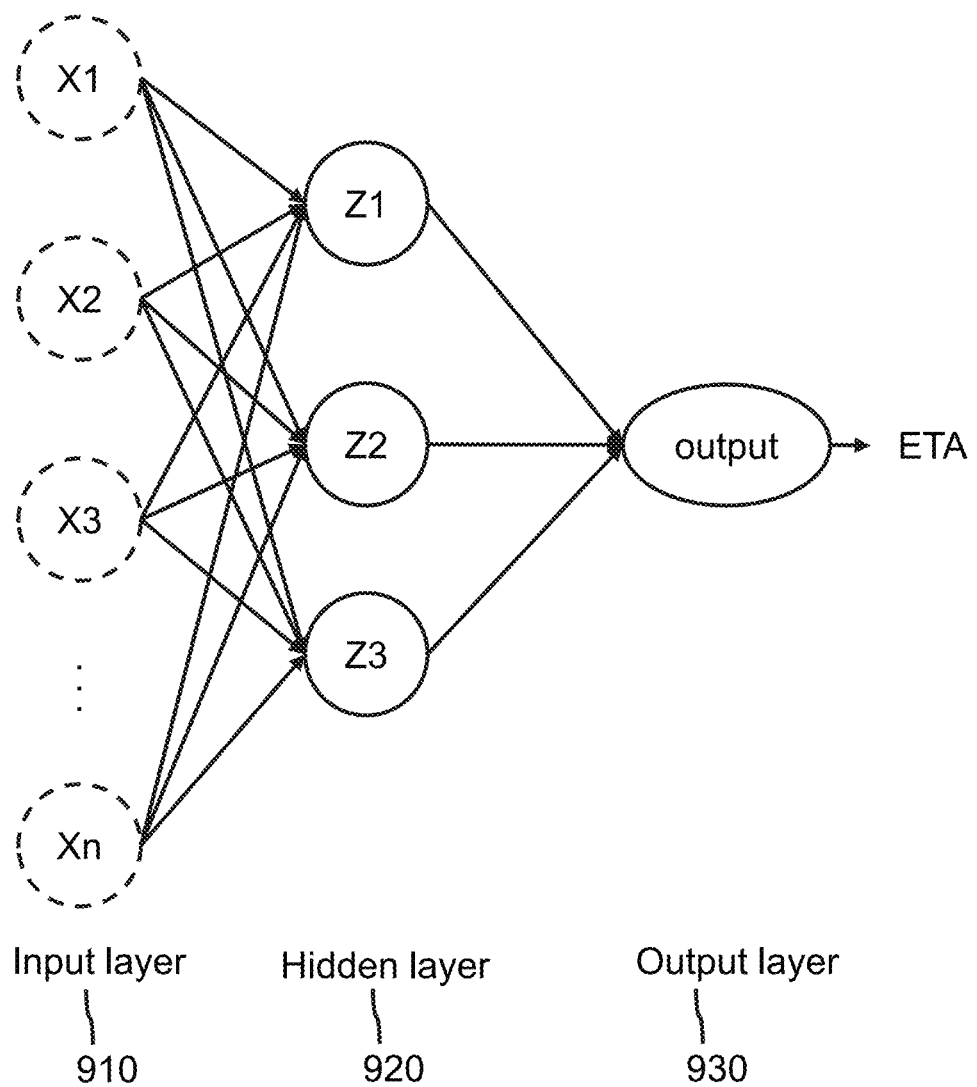
FIG. 9 is a schematic diagram illustrating an exemplary artificial neural network (ANN) as an ETA model according to some embodiments of the present disclosure.

FIG. 9 is a schematic diagram illustrating an exemplary diagram of an artificial neural network (ANN) as an ETA model according to some embodiments of the present disclosure. The ANN 900 may include an input layer 910, a hidden layer 920, and an output layer 930. The input layer 910 may include one or more artificial neurons that may connect with each other to form a net structure. As shown in FIG. 9, the input layer 910 may include artificial neuron X1, artificial neuron X2, artificial neuron X3, . . . , artificial neuron Xn. In some embodiments, the number of the artificial neurons in the input layer 910 may correspond to the number of the columns or the rows of the matrix representing a global feature vector. For example, if the global feature vector corresponding to N items or features is expressed as the vector with N columns or N rows, the number of the artificial neuron in the input layer 910 may be equal to N (e.g., 2000).

The hidden layer 920 may include three artificial neurons, artificial neuron Z1, artificial neuron Z2, and artificial neuron Z3. Each of the artificial neurons in the hidden layer 920 may be connected with each of the artificial neurons in the input layer 910; and each of the artificial neurons in the hidden layer 920 may be connected with artificial neuron in the output layer 930. For example, the artificial neuron may connect with artificial neuron X1, artificial neuron X2, artificial neuron X3, . . . , and artificial neuron Xn, respectively. Each of the artificial neuron in the hidden layer 920 may include a summation function. The summation function may be a threshold function or limiting function. For example, the summation function in the hidden layer may be expressed as formula (8):

$$O = f(\Sigma_{j=1}^{n} w_j \cdot x_j - \theta), \quad (8)$$

where O represents an output of artificial neuron to the artificial neuron in the output layer 930; f represents an activation function; $w_j$ represents weight between the artificial neuron in the hidden layer 920; $x_j$ represents input from artificial neuron Xj in the input layer 910 to the artificial neuron in the hidden layer 920; and θ represents a threshold.

The output layer 930 may include at least one artificial neuron. Each of the at least one artificial neuron in the output layer 930 may connect with the each of the artificial neurons in the hidden layer 920. For example, one artificial neuron in the output layer 930 may be connected with artificial neuron Z1, artificial neuron Z2, and artificial neuron Z3, respectively. Each of the artificial neuron in the output layer 930 may also include a summation function such as formula (8). For example, the activation function in the artificial neuron in the output layer 930 may be a step function expressed in formula (9):

$$f(x) = \begin{cases} 1, & \text{if } x \geq 0; \\ 0, & \text{if } x < 0, \end{cases} \quad (9)$$

For an example, the activation function may be expressed as a function with a continuous function value (e.g., formula (4)). The artificial neuron with activation function in the output layer 930 may output the ETA for a service request.

It should be noted that ANN 900 described in FIG. 9 is merely provided for illustration purposes, and not intended to limit the scope of the present disclosure. For persons having ordinary skills in the art, various modifications and changes in the forms and details of the application of the above method and system may occur without departing from the principles in the present disclosure. For example, number of the hidden layer 920 may be two or more. As another example, ANN 900 may further include a convolution layer and/or a pooling layer. The convolution layer and the pooling layer may be alternately arranged in the hidden layer 920. As still another example, ANN 900 may be modified or trained by deep learning methods.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An electronic system for obtaining an estimated time of arrival (ETA) for a service request, comprising:
at least one non-transitory computer-readable storage medium storing a set of instructions;
and at least one processor configured to communicate with the at least one non-transitory computer-readable storage medium, wherein when executing the set of instructions, the at least one processor is directed to execute the set of stored instructions to:
obtain a plurality of example historical service orders, each example historical service order of the plurality of example historical service orders including common features each associated with a section of a plurality of sections of a historical measurement, wherein at least two of the plurality of the example historical service orders are of variable trip distances, variable time interval of starting times, variable route information, and variable trip starting locations;
cluster the plurality of example historical service orders into a plurality of subsets of example historical service orders based on common features, the common feature of each example historical service order in a same subset of example historical service orders is associated with a same section of the historical measurement;
for at least one of the plurality of subsets of example historical service orders, use machine learning to train a first model of estimated time of arrival using the common feature of the subset of example historical service orders;
repeat the clustering and training steps for additional subset of example historical service orders using its respective common time feature to obtain a plurality of first ETA models encoded by structured data;
store the structured data in the at least one storage medium encoding the plurality of first ETA models;
receive a service request comprising service request features including a trip distance, a trip starting time, route information, and a trip starting location from a requester;
use a decision tree model to parse through the plurality of first ETA models based on the trip distance, the trip starting time, and the trip starting location of the service request to select one of the plurality of first ETA models as a target ETA model;
use the target ETA model to determine a target ETA for the service request;
and send the target ETA to a requester of the service request.

2. The electronic system of claim 1, wherein the historical measurement includes time;
each section of the plurality of sections of the historical measurement includes a predetermined period of time; and
the common feature includes at least one of a start time or an end time associated with an example historical service order of the plurality of example historical service orders.

3. The electronic system of claim 1, wherein historical measurement includes a location coordinate;
each section of the plurality of sections of the historical measurement includes a predetermined section of geographical area;
and the common feature includes at least one of a start location or an end location associated with an example historical service order of the plurality of example historical service orders.

4. The electronic system of claim 1, wherein, the decision tree is split first using the trip distance.

5. The electronic system of claim 4, wherein the processor is further directed to:
   determine a plurality of accuracy scores for the plurality of first ETA models; and
   select the target ETA model additionally based on the plurality of accuracy scores.

6. The system of claim 4, wherein the decision tree is further split using one of the trip starting time, route information, and the trip starting location.

7. A method of using an electronic system for obtaining an estimated time of arrival (ETA) for a service request, the system comprising:
   at least one non-transitory computer-readable storage medium storing a set of instructions; and
   at least one processor configured to communicate with the at least one storage medium, wherein, the at least one processor is directed to execute the set of stored instructions, the method comprising:
   obtaining, by at least one processor, a plurality of example historical service orders, each example historical service order of the plurality of example historical service orders including common features each associated with a section of a plurality of sections of a historical measurement, wherein at least two of the plurality of the example historical service orders are of variable trip distances, variable time interval of starting times, variable route information, and variable trip starting locations;
   clustering the plurality of example historical service orders into a plurality of subsets of example historical service orders, the common feature of each example historical service order in a same subset of example historical service orders is associated with a same section of the historical measurement;
   for at least one of the plurality of subsets of example historical service orders, using machine learning to train a first ETA model using the common feature of the subset of example historical service orders;
   repeating the clustering and training steps for additional subset of example historical service orders, using its respective common feature, to obtain a plurality of first ETA models encoded by structured data;
   storing the structured data in the at least one storage medium encoding the plurality of first ETA models;
   receiving a service request, comprising service request feature including a trip distance, a trip starting time, route information, and a trip starting location, from a requester;
   using a decision tree model to parse through the plurality of first ETA models based on the trip distance, the trip starting time, and the trip starting location of the service request to select one of the plurality of first ETA models as a target ETA model;
   using the target ETA model to determine a target ETA for the service request by combining candidate ETAs including the first candidate ETA and the second candidate ETA; and
   sending the target ETA to the requester of the service request.

8. The method of claim 7, wherein the historical measurement includes time;
   each section of the plurality of sections of the historical measurement includes a predetermined period of time; and
   the common feature includes at least one of a start time or an end time associated with an example historical service order of the plurality of example historical service orders.

9. The method of claim 7, wherein historical measurement includes a location coordinate;
   each section of the plurality of sections of the historical measurement includes a predetermined section of geographical area; and
   the common feature includes at least one of a start location or an end location associated with an example historical service order of the plurality of example historical service orders.

10. The method of claim 7, wherein the decision tree is split using the trip distance.

11. The method of claim 10, further comprising:
    determining a plurality of accuracy scores for the plurality of first ETA models; and
    selecting the target ETA model additionally based on the plurality of accuracy scores.

12. The method of claim 10, wherein the decision tree is further split using one of the trip starting time, route information, and the trip starting location.

13. A non-transitory computer readable medium embodying a computer program product, the computer program product comprising instructions configured to cause a computing device to:
    obtain a plurality of example historical service orders, each example historical service order of the plurality of example historical service orders including common features each associated with a section of a plurality of sections of a historical measurement, wherein at least two of the plurality of the example historical service orders are of variable trip distances, variable time interval of starting times, variable route information, and variable trip starting locations;
    cluster the plurality of example historical service orders into a plurality of subsets of example historical service orders based on common features, the common feature of each example historical service order in a same subset of example historical service orders is associated with a same section of the historical measurement;
    for at least one of the plurality of subsets of example historical service orders, use machine learning to train a first model of estimated time of arrival using the common feature of the subset of example historical service orders;
    repeat the clustering and training steps for additional subset of example historical service orders using its respective common time feature to obtain a plurality of first ETA models encoded by structured data;
    store the structured data in the at least one storage medium encoding the plurality of first ETA models;
    receive a service request comprising service request features including a trip distance, a trip starting time, route information, and a trip starting location from a requester;
    use a decision tree model to parse through the plurality of first ETA models based on the trip distance, the trip starting time, and the trip starting location of the service request to select one of the plurality of first ETA models as a target ETA model;
    use the target ETA model to determine a target ETA for the service request;
    and send the target ETA to a requester of the service request.

14. The medium of claim 13, wherein the historical measurement includes time;
- each section of the plurality of sections of the historical measurement includes a predetermined period of time; and
- the common feature includes at least one of a start time or an end time associated with an example historical service order of the plurality of example historical service orders.

15. The medium of claim 13 wherein historical measurement includes a location coordinate;
- each section of the plurality of sections of the historical measurement includes a predetermined section of geographical area; and
- the common feature includes at least one of a start location or an end location associated with an example historical service order of the plurality of example historical service orders.

16. The medium of claim 13, wherein the decision tree is split first using the trip distance.

17. The medium of claim 16, wherein the decision tree is further split using one of the trip starting time, route information, and the trip starting location.

18. The medium of claim 16, wherein the computing device is further directed to:
- determine a plurality of accuracy scores for the plurality of first ETA models; and
- select the target ETA model additionally based on the plurality of accuracy scores.

* * * * *